United States Patent
Ren

(10) Patent No.: US 10,496,842 B1
(45) Date of Patent: Dec. 3, 2019

(54) MULTI-PRONGED FILE ANOMALY DETECTION BASED ON VIOLATION COUNTS

(71) Applicant: DiDi Research America, LLC, Mountain View, CA (US)

(72) Inventor: Liwei Ren, San Jose, CA (US)

(73) Assignee: DiDi Research America, LLC, Mountain View, CA (US)

( * ) Notice: Subject to any disclaimer, the term of this patent is extended or adjusted under 35 U.S.C. 154(b) by 0 days.

(21) Appl. No.: 16/035,764

(22) Filed: Jul. 16, 2018

(51) Int. Cl.
| | | |
|---|---|---|
| *G06F 21/62* | (2013.01) | |
| *G06F 21/60* | (2013.01) | |
| *H04L 29/06* | (2006.01) | |
| *G06F 16/11* | (2019.01) | |
| *G06F 16/28* | (2019.01) | |

(52) U.S. Cl.
CPC ........ *G06F 21/6218* (2013.01); *G06F 16/122* (2019.01); *G06F 16/285* (2019.01); *G06F 21/604* (2013.01); *H04L 63/102* (2013.01); *H04L 63/20* (2013.01); *G06F 2221/2141* (2013.01)

(58) Field of Classification Search
CPC .. G06F 21/6218; G06F 16/122; G06F 16/285; G06F 21/604; G06F 2221/2141; H04L 63/102; H04L 63/20
See application file for complete search history.

(56) References Cited

U.S. PATENT DOCUMENTS

| | | | |
|---|---|---|---|
| 7,178,033 B1 | 2/2007 | Garcia | |
| 8,141,127 B1 * | 3/2012 | Mustafa | G06F 21/552 726/1 |
| 8,495,705 B1 * | 7/2013 | Verma | G06Q 10/10 726/2 |
| 8,726,392 B1 * | 5/2014 | McCorkendale | G06F 21/56 713/188 |
| 9,762,603 B2 * | 9/2017 | Grondin | G06F 16/24578 |
| 2009/0119745 A1 * | 5/2009 | Chung | G06F 21/6263 726/1 |
| 2009/0271863 A1 | 10/2009 | Govindavajhala et al. | |
| 2010/0293174 A1 | 11/2010 | Bennett et al. | |
| 2012/0131012 A1 | 5/2012 | Taylor et al. | |
| 2013/0104190 A1 * | 4/2013 | Simske | G06F 21/60 726/1 |
| 2013/0246334 A1 | 9/2013 | Ahuja et al. | |

(Continued)

OTHER PUBLICATIONS

International Search Report and the Written Opinion dated Mar. 28, 2019, issued in related International Application No. PCT/US2018/067921 (11 pages).

(Continued)

*Primary Examiner* — Christopher A Revak
(74) *Attorney, Agent, or Firm* — Sheppard Mullin Richter & Hampton LLP

(57) ABSTRACT

File classification information for a set of files are obtained. The file classification information defines (1) a number of classified files within the set of files, (2) a number of classification categories associated with the classified files, (3) a number of unauthorized classified files that do not match an access privilege of a user, and (4) a number of unauthorized classification categories associated with the unauthorized classified files. A violation of an access control policy is determined based on the file classification information.

20 Claims, 6 Drawing Sheets

(56) References Cited

U.S. PATENT DOCUMENTS

2018/0034857 A1* 2/2018 Ferrara ................... H04L 63/20
2018/0234430 A1* 8/2018 Walstad ................ H04L 63/105
2019/0171846 A1* 6/2019 Conikee .............. G06F 21/6245

OTHER PUBLICATIONS

Bishop, "Vulnerabilities analysis." In: Proceedings of the Recent Advances in Intrusion Detection. 1999, Retrieved on Apr. 2, 2019, from http://citeseerx.ist.psu.edu/viewdoc/download?doi=10.1.1.126. 2477&rep=rep1&type=pdf.

* cited by examiner

*300*

MULTI-PRONGED FILE ANOMALY DETECTION BASED ON VIOLATION COUNTS

TECHNICAL FIELD

The disclosure relates generally to protecting sensitive data using a multi-pronged file anomaly detection.

BACKGROUND

Classification categories, such as those indicating sensitivity of information contained in files or classified nature of files, may be used in computing systems to protect the contents of the files. For instance, data leakage protection technologies may use classification categories with which files are associated to provide real-time prevention of data leaks (unauthorized access of the files). That is, data leakage protection technologies may attempt to protect classified files when unauthorized access of the classified files are about to take place. Such technologies provide incomplete protection of classified files. For example, such technologies do not account for risk of data leakage prior to data leaking event, facilitate preventative actions prior to data leaking events, or effectively provide for analysis of data leaking events.

SUMMARY

One aspect of the present disclosure is directed to a method for protecting sensitive data. The method may comprise: obtaining file classification information for a set of files, the file classification information defining (1) a number of classified files within the set of files, (2) a number of classification categories associated with the classified files, (3) a number of unauthorized classified files that do not match an access privilege of a user, and (4) a number of unauthorized classification categories associated with the unauthorized classified files; and determining a violation of an access control policy based on the file classification information.

Another aspect of the present disclosure is directed to a system for protecting sensitive data. The system may comprise one or more processors and a memory storing instructions. The instructions, when executed by the one or more processors, may cause the system to perform: obtaining file classification information for a set of files, the file classification information defining (1) a number of classified files within the set of files, (2) a number of classification categories associated with the classified files, (3) a number of unauthorized classified files that do not match an access privilege of a user, and (4) a number of unauthorized classification categories associated with the unauthorized classified files; and determining a violation of an access control policy based on the file classification information.

Another aspect of the present disclosure is directed to a non-transitory computer readable medium for protecting sensitive data. The non-transitory computer-readable medium may comprise instructions that, when executed, cause one or more processors to perform: obtaining file classification information for a set of files, the file classification information defining (1) a number of classified files within the set of files, (2) a number of classification categories associated with the classified files, (3) a number of unauthorized classified files that do not match an access privilege of a user, and (4) a number of unauthorized classification categories associated with the unauthorized classified files; and determining a violation of an access control policy based on the file classification information.

In some embodiments, determining the violation of the access control policy based on the file classification information may include: determining a risk parameter based on (1) the number of classified files within the set of files, (2) the number of classification categories associated with the classified files, (3) the number of unauthorized classified files that do not match the access privilege of the user, and (4) the number of unauthorized classification categories associated with the unauthorized classified files; and determining the violation of the access control policy based on the risk parameter exceeding a risk parameter threshold.

In some embodiments, determining the violation of the access control policy based on the file classification information may include: determining the violation of the access control policy based on the number of unauthorized classified files that do not match the access privilege of the user exceeding an unauthorized classified files threshold.

In some embodiments, determining the violation of the access control policy based on the file classification information may include: determining the violation of the access control policy based on the number of unauthorized classification categories associated with the unauthorized classified files exceeding an unauthorized classification categories threshold.

In some embodiments, the set of files may be stored in an electronic storage of a computing device, and at least a portion of the file classification information for the set of files may be determined by a discovery agent running on the computing device. The discovery agent may determine at least the portion of the file classification information based on (1) a determination of the classification categories associated with the classified files, and (2) the access privilege of the user.

In some embodiments, one or more analyses may be performed based on the determination of the violation of the access control policy. For example, a prevention analysis of the classified files may be performed based on the determination of the violation of the access control policy. As another example, a post-leak analysis of the classified files may be performed based on the determination of the violation of the access control policy.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve data leakage protection technologies for protecting classified files. By using file classification information for a set of files, a violation of an access control policy for the set of files may be determined. Usage of the file classification information may provide for refined and flexible access control policy violation determination. Based on the determination of access control policy violation, data leakage protection may be improved. For instance, potentially problematic (e.g., prone to data leak) storage of classified files may be identified, and such identification may be used for prevention analysis or post-leak analysis. The approaches disclosed herein may provide for comprehensive data leakage protection that accounts for risk of data leakage prior to data leaking event, facilitates preventative actions prior to data leaking events, and effectively provides for analysis of data leaking events.

Figure 1:
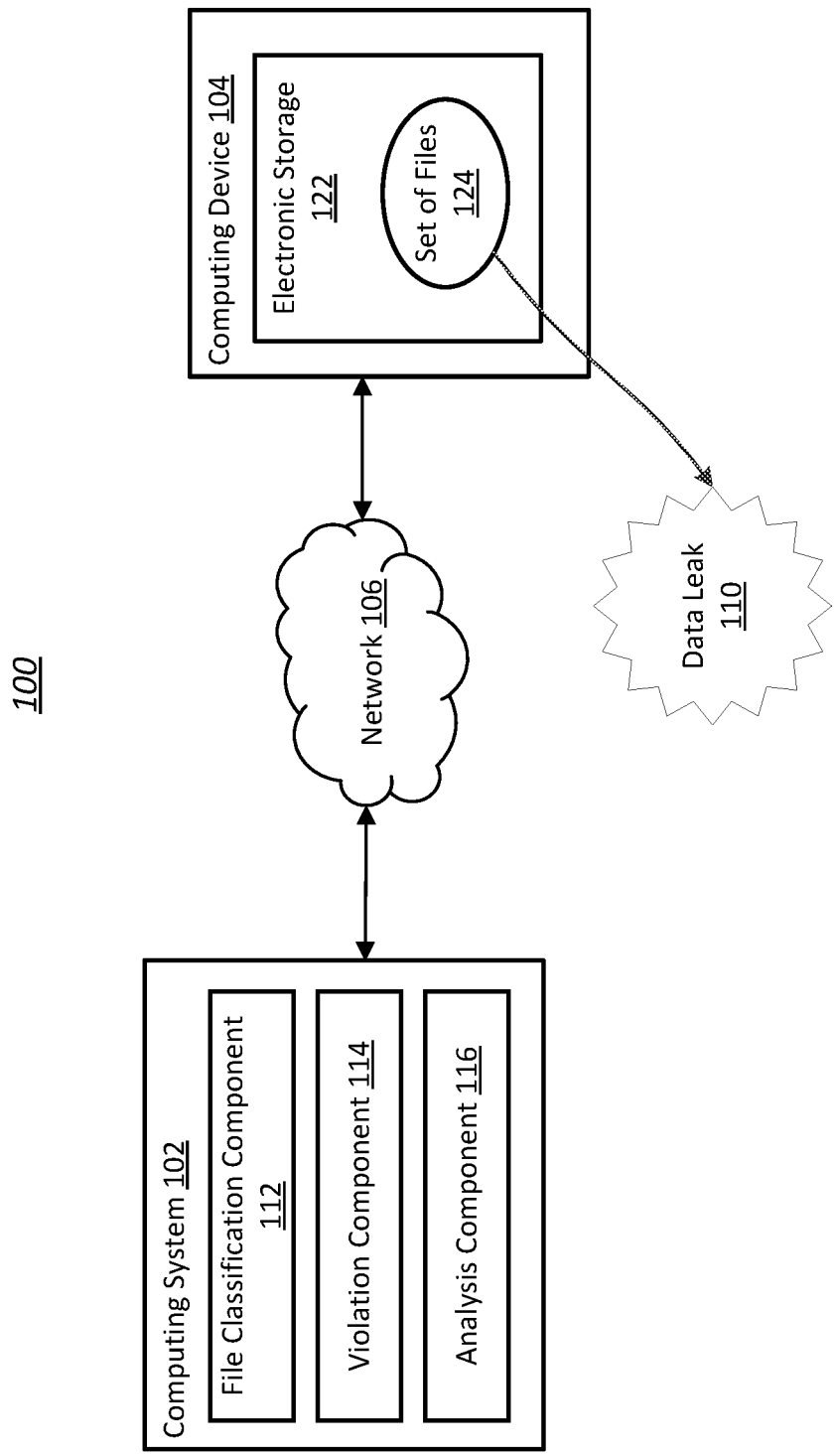
FIG. 1 illustrates an example environment for protecting sensitive data, in accordance with various embodiments of the disclosure.

FIG. 1 illustrates an example environment 100 for protecting sensitive data, in accordance with various embodiments. The example environment 100 may include a computing system 102 (e.g., a server) and a computing device 104 (e.g., a client device, desktop, laptop, smartphone, tablet, mobile device). The computing system 102 and the computing device 104 may include one or more processors and memory (e.g., permanent memory, temporary memory). The processor(s) may be configured to perform various operations by interpreting machine-readable instructions stored in the memory. The computing system 102 and/or the computing device 104 may include other computing resources and/or have access (e.g., via one or more connections/networks) to other computing resources.

The computing system 102 may include a file classification component 112, a violation component 114, an analysis component 116, and/or other components. The computing system 102 and the computing device 104 may be connected through one or more networks (e.g., a network 106). The computing system 102 and the computing device 104 may exchange information using the network 106. The computing system 102 and the computing device 104 may communicate over the network 106 using one or more communication protocols. The computing system 102 may be a server of the network 106 and the computing device 104 may be a node of the network 106.

While the computing system 102 and the computing device 104 are shown in FIG. 1 as single entities, this is merely for ease of reference and is not meant to be limiting. One or more components/functionalities of the computing system 102 and/or the computing device 104 described herein may be implemented in a single computing device or multiple computing devices. For example, one or more components/functionalities of the computing system 102 may be implemented in the computing device 104 and/or distributed across multiple computing devices. For instance, the computing device 104 may represent a computing platform, such as an email system or a file server, and the components/functionalities of the computing system 102 may be implemented within the computing platform or in one or more other computing devices.

The computing device 104 may include an electronic storage 122. The electronic storage 122 may refer to a device for storing information, such as information defining computer files. The electronic storage 122 may include one or more storage media in which information may be stored. For example, the electronic storage 122 may include optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), or other electronically readable storage media. The electronic storage may be part of the computing device 104 (e.g., integrated into the computing device 104) or removably coupled to the computing device 104.

The electronic storage 122 may store a set of files 124 and other information. The set of files 124 may include one or more files. A file may refer to a collection of data or information that has a name (filename). The set of files 124 may include files of the same type. The set of files 124 may include files of different types. For example, the set of files 124 may include one or more of the following file types: data files, text files, program files, directory files, system files. Other types of files are contemplated. Files within the set of files 124 may be stored within a single storage media or across multiple storage media. Files within the set of files 124 may be stored within a single file directory or across multiple file directories.

One or more of the files within the set of files 124 may be associated with one or more classification categories. Classification categories may refer to classes, groupings, or divisions to which files may belong based on contents of the files. Classification categories may identify one or more types of contents of the files. For example, a classification category with which a file is associated may indicate a level or an amount of sensitive information contained within the file. As another example, a classification category with which a file is associated may indicate a level or an amount of classified information contained within the file. Other types of classification categories are contemplated.

An association of a file with a classification category may have been previously determined. For example, a file may have been marked with a classification marking for a classification category. As another example, a database may include information that matches an identifier of the file (e.g., filename, fingerprint) with a classification category. An association of a file with a classification category may be determined when needed. For example, a keyword or an expression may be associated with a classification category and the contents of a file may be scanned to determine the classification category of the file based on the keyword(s) or expression(s) contained within the file. A file that is associated with a classification category may be referred to as a classified file.

In some embodiments, a file may be associated with multiple classification categories. For example, a file may be associated with multiple types of classification categories. As another example, different portions of a file may be associated with different classification categories. For instance, one part of the file may be associated with a low classification category while another part of the file may be associated with a high classification category.

The classification categories may determine which users or which groups of users are authorized to access the files. Authorized access of a file may be divided into different types of access. For example, a user's full access to a file may include the user being authorized to open the file, rename the file, add a property to the file, remove a property of the file, change a property of the file, copy the file, delete the file, change the location of the file, share the file, view information in the file, add information to the file, remove information from the file, change information in the file, and otherwise access the file. A user's limited access to a file may include the user being authorized to perform only a subset of activities authorized under full access.

Different users or user groups may be authorized to access files associated with different classification categories. For example, one user or one user group may be authorized to access files associated with a particular classification category while another user or another user group may be authorized to access files associated with another classification categories. As another example, one user or one user group may be authorized to access files associated with a range of classification categories (e.g., low-sensitivity classification, mid-sensitivity classification, high-sensitivity classification) while another user or another user group may be authorized to access files associated with a subset of the range of classification categories (e.g., low sensitivity classification).

In some embodiments, authorized access of files by a user or a user group may be limited based on time of access. For example, a particular user or a user group may be authorized to access files associated with a classification categories at set times or time intervals. In some embodiments, authorized access of files by a user or a user group may be limited based on location of access. For example, a particular user or a user group may be authorized to access files associated with a classification categories from one or more particular geographical locations or using one or more particular computing devices.

The relationships between users, user groups and authorized classification categories may form a mapping of users, user groups and classification categories. Such mapping may be referred to as an authorization mapping. The authorization mapping may link users and user groups to those classification categories for which access is authorized. The authorization mapping may include multiple to multiple mapping (M to N mapping). The authorization mapping may provide information on access privilege of a user or a user group. Access privilege of a user or a user group may refer to information that defines classification categories for which access is authorized for the user or the user group.

The computing device 104 or another computing device coupled to the computing device 104 may generate file classification information for the set of files 124 and provide the file classification information for the set of files 124 to the computing system 102 over the network 106. The computing device 104 or another computing device coupled to the computing device 104 may run one or a combination of software, program, process, agent, or other tools to determine the file classification information for the set of files 124. For example, a scanning agent or a discovery agent may run on the computing device 104 to analyze the set of files 124 and determine the classification categories associated with the file(s) within the set of files 124. The agent may determine one or more portions of the file classification information for the set of files 124 based on (1) a determination of the classification categories associated with the classified file(s) within the set of files 124, and (2) the access privilege of the user associated with the computing device 104, such as the access privilege of the user to which the computing device 104 is registered or the access privilege of the user that is known to use the computing device 104.

The agent may traverse one or more folders of the electronic storage 122 to discover and analyze the set of files 124. The agent may scan the electronic storage 122 entirely or incrementally. The agent may scan the electronic storage 122 or one or more parts of the electronic storage 122 based on one or more events. For example, the agent may scan a file or a folder in which the file is located based on a change to the file (e.g., modification of the content of the file, creation of the file, uploading/download of the file). As another example, the agent may perform the scan of the set of files 124 based on system or user prompt, such as a system or user prompt requesting a scan of the set of files 124 or requesting the file classification information for the set of files 124.

The agent may scan the electronic storage 122 or one or more parts of the electronic storage based on a schedule. For example, the agent may scan the electronic storage 122 periodically to provide updated file classification information. The file classification information may be determined at regular intervals or irregular intervals.

The file classification information for the set of files 124 may be provided to the computing system 102. The provision of the file classification information to the computing system 102 may enable analysis of potential risk of data leak for the set of files. The provision of the file classification information to the computing system 102 may enable determination of one or more violations of an access control policy for the set of files 124. Such determination may be used to perform a prevention analysis of the classified files within the set of files 124. Such determination may be used to perform a post-leak analysis of the classified files within the set of files 124. A prevention analysis or a post-leak analysis of the classified files may be used to prevent or reduce the likelihood of a data leak 110 of the classified files within the set of files 124. That is, unauthorized access of the classified files within the set of files 124 may be prevented or reduced.

The file classification information for the set of files 124 may include information relating to classified file(s) within the set of files 124. The files classification information may define (1) a number of classified files within the set of files 124, (2) a number of classification categories associated with the classified files, (3) a number of unauthorized classified files that do not match an access privilege of a user, and (4) a number of unauthorized classification categories associated with the unauthorized classified files.

The file classification information may include information on how many of the files within the set of files 124 are associated with a classification category. The file classification information may include information on how many of the files within the set of files 124 are associated with a particular classification category. That is, the file classification information may include information that identifies the number of classified files associated with different classification categories. The total number of classified files within the set of files 124 may be represented as CountFT.

The file classification information may include information on how many classification categories are associated with classified file(s) within the set of files 124. The file classification information may include information on how many different classification categories are associated with the classified files within the set of files 124. The file classification information may include information that identifies the classification categories associated with classified file(s) within the set of files 124. The total number of classification categories associated with the classified file(s) within the set of files 124 may be represented as CountCT.

The file classification information may include information on how many of the classified files within the set of files 124 do not match the access privilege of the user. That is, the file classification information may include information that identifies the number of classified files within the set of files 124 for which the user of the computing device 104 is not authorized to access. Classified files for which the user does not have authorization to access may be referred to as unauthorized classified files. Whether a classified files is an unauthorized classified file may be determined by comparing the classification category with which the file is associated and the access privilege of the user. The total number of unauthorized classified files within the set of files 124 may be represented as CountVT.

The file classification information may include information on how many unauthorized classification categories are associated with unauthorized classified file(s) within the set of files 124. That is, the file classification information may include information that identifies the number of classification categories associated with the unauthorized classified files within the set of files 124. Classification categories for which the user does not have authorization to access may be referred to as unauthorized classification categories. The total number of unauthorized classification categories associated with the unauthorized classified file(s) within the set of files 124 may be represented as CountNCT.

The file classification component 112 may be configured to obtain file classification information for the set of files 124. Obtaining file classification information may include one or a combination of accessing, acquiring, analyzing, determining, examining, identifying, loading, locating, opening, receiving, retrieving, reviewing, storing, or otherwise obtaining the file classification information. The file classification component 112 may obtain file classification information for the set of files 124 from a hardware component, such as an electronic storage, or a software component, such as a process running on a computing device. The file classification component 112 may obtain file classification information for the set of files 124 from the computing device 104 or another computing device coupled to the computing device 104. The file classification component 112 may obtain the file classification information directly from the computing device that determined the file classification information or through one or more intermediary devices (e.g., routers, modems, servers). The file classification information may be pushed to the file classification component 112. The file classification information may be pulled by the file classification component 112.

The violation component 114 may be configured to determine one or more violations of an access control policy based on the file classification information. An access control policy may refer to a set of rules or standards by which access to one or more files are controlled. An access control policy may define a set of rules or standards by which a data leak alert may be generated. An access control policy may define a set of rules or standards by which potentially problematic storage of classified files may be identified. For example, an access control policy for the set of files 124 may include rules or standards by which access to the set of files 124 are controlled, a data leak alert for the set of files 124 may be generated, or potentially problematic storage of classified files within the set of files 124 are identified. For instance, the access control policy for the set of files 124 may define one or a combination of (1) an acceptable number of unauthorized classified files within the set of files 124, (2) an acceptable number of unauthorized classification categories associated with the unauthorized classified files within the set of files 124, or (3) an acceptable amount of a risk parameter for the set of files 124. The violation of one or a combination of the above rules may be used to control access to the set of files 124, generate a data leak alert for the set of files 124, or identify potentially problematic storage of classified files within the set of files.

A violation of the access control policy may be determined based on a risk parameter for the set of files 124. A risk parameter for the set of files 124 may refer to a measurable value indicating a level of risk to which the set of files 124 is prone to data leakage. That is, the risk parameter may indicate the level (e.g., amount, percentage, low/medium/high) of risk that one or more of the classified files within the set of files 124 may be accessed by an unauthorized user. The risk parameter for the set of files 124 may be calculated based on one or a combination of (1) the number of classified files within the set of files (CountFT), (2) the number of classification categories associated with the classified files (CountCT), (3) the number of unauthorized classified files that do not match the access privilege of the user (CountVT), or (4) the number of unauthorized classification categories associated with the unauthorized classified files (CountNCT). For example, the risk parameter may be a function of (CountFT, CountCT, CountVT, CountNCT). The risk parameter for the set of files 124 may be represented as ScoreDL. A violation of the access control policy may be determined based on the risk parameter (ScoreDL) exceeding a risk parameter threshold (c), the acceptable amount of the risk parameter for the set of files 124. In some embodiments, a violation of the access control policy may be determined based on the risk parameter meeting the risk parameter threshold. This risk parameter violation rule may be represented as: $ScoreDL > c$, or $ScoreDL \geq c$.

A violation of the access control policy may be determined based on the number of unauthorized classified files that do not match the access privilege of the user. For example, a violation of the access control policy may be determined based on the number of unauthorized classified files that do not match the access privilege of the user exceeding an unauthorized classified files threshold (k), the acceptable number of unauthorized classified files within the set of files 124. If the unauthorized classified files threshold (k) is set to zero, then the presence of any unauthorized classified file within the set of files 124 may trigger a violation of the access control policy. As another example, a violation of the access control policy may be determined based on the number of unauthorized classified files that do not match the access privilege of the user meeting the unauthorized classified files threshold (k). This unauthorized classified file violation rule may be represented as: CountVT>k, or CountVT≥k.

A violation of the access control policy may be determined based on the number of unauthorized classification categories associated with the unauthorized classified files. For example, a violation of the access control policy may be determined based on the number of unauthorized classification categories associated with the unauthorized classified files exceeding an unauthorized classification categories threshold (n), the acceptable number of unauthorized classification categories associated with the unauthorized classified files within the set of files 124. If the unauthorized classification categories threshold (n) is set to zero, then the presence of any unauthorized classified file/unauthorized classification category within the set of files 124 may trigger a violation of the access control policy. As another example, a violation of the access control policy may be determined based on the number of unauthorized classification categories associated with the unauthorized classified files meeting the unauthorized classification categories threshold (n). This unauthorized classified category violation rule may be represented as: CountNCT>n, or CountNCT≥n.

One or more of the thresholds for which a violation of the access control policy is determined may be set based on user input, the file(s) within the set of files 124, the classification categories associated with the file(s) within the set of files 124, or the access privilege of the user of the computing device 104. For example, a user may set or specify the values of the risk parameter threshold (c), the unauthorized classified files threshold (k), or the unauthorized classification categories threshold (n). As another example, the values of the risk parameter threshold (c), the unauthorized classified files threshold (k), or the unauthorized classification categories threshold (n) may be determined based on the classification categories associated with the classified files within the set of files 124. For instance, if the classified files are associated with classification categories of high sensitivity/classification, one or more of the threshold values may set to a low value. If the classified files are associated with classification categories of low sensitivity/classification, one or more of the threshold values may be set to a high value. As yet another example, the values of the risk parameter threshold (c), the unauthorized classified files threshold (k), or the unauthorized classification categories threshold (n) may be determined based on the access privilege of the user of the computing device 104. For instance, different access privileges may be associated with different threshold values.

In some embodiments, a violation of the access control policy may be determined based on a combination of multiple violation rules. For example, a violation of the access control policy may be determined based on violation of a certain number of violation rules. As another example, a violation of the access control policy may be determined based violations of a particular violation rule and one or more other violation rules. As yet another example, different combinations of violation rules may be specified to determine a violation of the access control policy. In some embodiments, a violation of one or more violation rules may change one or more other violation rules. For example, if the unauthorized classified category violation rule is violated, then a lower threshold value may be used for the risk parameter violation rule. In some embodiments, one or more of the threshold values may include different ranges of values. For example, referring to the above example of change in violation rule, the amount by which the risk parameter threshold (c) may be lowered may depend on whether the number of unauthorized classification categories associated with the unauthorized classified files (CountNCT) exceed a lower unauthorized classification categories threshold (n low) or a higher unauthorized classification categories threshold (n high). Such use of combination of violation rules or adaptive threshold values may provide for a refined and flexible access control policy violation determination.

The analysis component 116 may be configured to perform one or more analysis based on the determination of the violation of the access control policy. For example, the analysis component 116 may perform a prevention analysis of the classified files within the set of files 124 based on the determination of the violation of the access control policy. As another example, the analysis component 116 may perform a post-leak analysis of the classified files within the set of files 124 based on the determination of the violation of the access control policy. A prevention analysis of the classified files may include monitoring of the classified files within the set of files 124. The classified files may be monitored while the classified files are not being used, while the classified files are being used, or while the classified files are being moved to determine how and when the classified files may be leaked. A prevention analysis of the classified files may include monitoring of the user of the computing device 104. The user may be monitored to determine user activities or behaviors that may be indicative of data leak.

A post-leak analysis may include analysis of how the classified files were accessed without authorization. A post-leak analysis may include an analysis of the classified files that were leaked, an analysis of the behavior of the user of the computing device 104, or other analysis of events that impacted or were related to the data leak.

A prevention analysis or a post-leak analysis may facilitate changes in the classified files, user access privileges, access control policy, or other operations of the computing device 104 to prevent or reduce the likelihood of data leak. Performing such prevention analysis or post-leak analysis on all files, all computing devices, or all users of an organization may not be practicable. For instance, such analysis may require expenditure of great amount of computing resources and time. The determination of the violation of the access control policy as disclosed herein may be used to target particular file(s), computing device(s), or user(s) for prevention analysis or post-leak analysis. This may allow for efficient use of computing resources and time to improve data leakage protection.

Figure 2:
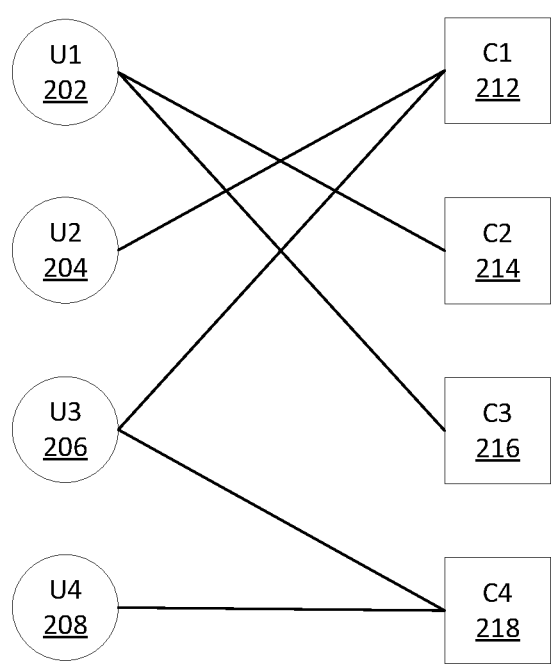
FIG. 2 illustrates an example mapping of user groups and classification categories, in accordance with various embodiments of the disclosure.

FIG. 2 illustrates an example mapping 200 of user groups and classification categories, in accordance with various embodiments of the disclosure. User groups U1 202, U2 204, U3 206, U4 208 may represent individual users or groups of users. Classification categories C1 212, C2 214, C3, 216, C4 218 may represent different classification categories with which a file may be associated. The relationships between user groups 202, 204, 206, 208 and classification categories 212, 214, 216, 218 may form the mapping 200. The mapping 200 may link user groups 202, 204, 206, 208 to those classification categories 212, 214, 216, 218 for which access is authorized. For example, user group U1 202 may be authorized to access files associated with classification categories C2 214 and C3 216. User group U2 204 may be authorized to access files associated with classification category C1 212. User group U3 206 may be authorized to access files associated with classification categories C1 212 and C4 218. User group U4 208 may be authorized to access files associated with classification category C4 218.

Authorized access of files as defined by the mapping 200 may include different types of access. For example, access of the user group U1 202 to files associated with the classification category C2 214 may include full access (e.g., open the file, rename the file, add a property to the file, remove a property of the file, change a property of the file, copy the file, delete the file, change the location of the file, share the file, view information in the file, add information to the file, remove information from the file, change information in the file) while access of the user group U1 202 to files associated with the classification category C3 216 may include limited access (e.g., a subset of activities authorized under full access).

Authorized access of files as defined by the mapping 200 may be limited by time or location. For example, access of the user group U2 204 to files associated with the classification category C1 212 may be limited to set times or time intervals. As another example, access of the user group U3 to files associated with the classification category C1 212 may be limited to access from a particular geographical location or through a particular computing device.

Figure 3:
FIG. 3 illustrates an example flow diagram for comprehensive data leakage protection, in accordance with various embodiments of the disclosure.
Figure 4:
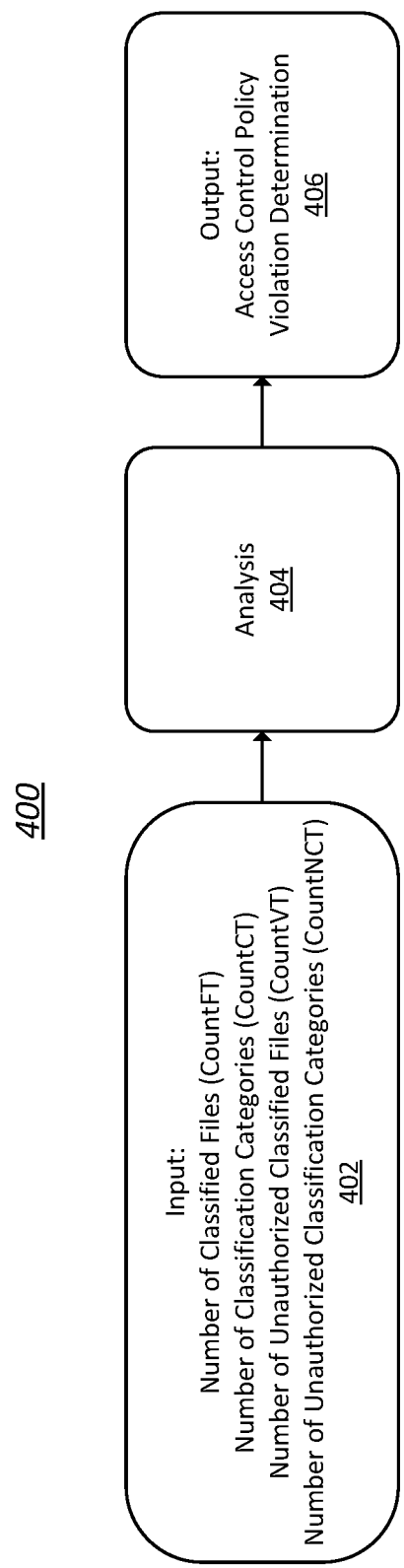
FIG. 4 illustrates an example flow diagram for determining a violation of an access control policy, in accordance with various embodiments of the disclosure.

FIG. 3 illustrates an example flow diagram for a comprehensive data leakage protection 300, in accordance with various embodiments of the disclosure. The comprehensive data leakage protection may include a prevention analysis 302, a real-time prevention 304, and a post-leak analysis 306. The combination of the prevention analysis 302, the real-time prevention 304, and the post-leak analysis 306 may establish defense lines against data leaks at three stages in chronological order as shown in FIG. 3. The prevention analysis 302 may include measuring risks of data leak, and suggesting or taking preventive actions prior to data leaking events. The real-time prevention 304 may include stopping data leak when data leaking attempts are made. The post-leak analysis 306 may include synergizing and correlating events from data leakage protection system and other security systems for post-data leaking event analysis. The prevention analysis 302 or the post-leak analysis 306 may be performed based on determination of a violation of the access control policy FIG. 4 illustrates an example flow diagram for determining a violation of an access control policy 400, in accordance with various embodiments of the disclosure. Input 402 for determining the violation of the access control policy may be provided. The input 402 may include a number of classified files within a set of files (CountFT), (2) a number of classification categories associated with the classified files (CountCT), (3) a number of unauthorized classified files within the set of files that do not match an access privilege of a user (CountVT), and (4) a number of unauthorized classification categories associated with the unauthorized classified files (CountNCT).

An analysis 404 may be performed based on the input 402. The analysis may include one or a combination of (1) a comparison of a risk parameter (ScoreDL) with a risk parameter threshold, where the risk parameter (ScoreDL) is determined based on one or a combination of (a) the number of classified files within the set of files (CountFT), (b) the number of classification categories associated with the classified files (CountCT), (c) the number of unauthorized classified files that do not match the access privilege of the user (CountVT), or (d) the number of unauthorized classification categories associated with the unauthorized classified files (CountNCT); (2) a comparison of the number of unauthorized classified files that do not match the access privilege of the user (CountVT) with an unauthorized classified files threshold; or (3) a comparison of the number of unauthorized classification categories associated with the unauthorized classified files (CountNCT) with an unauthorized classification categories threshold.

An output 406 of the analysis 404 may include a determination of whether an access control policy has been violated. The violation of the access control policy may be determined based on one or a combination of (1) the risk parameter (ScoreDL) exceeding the risk parameter threshold; (2) the number of unauthorized classified files that do not match the access privilege of the user (CountVT) exceeding the unauthorized classified files threshold; or (3) the number of unauthorized classification categories associated with the unauthorized classified files (CountNCT) exceeding the unauthorized classification categories threshold.

Figure 5:
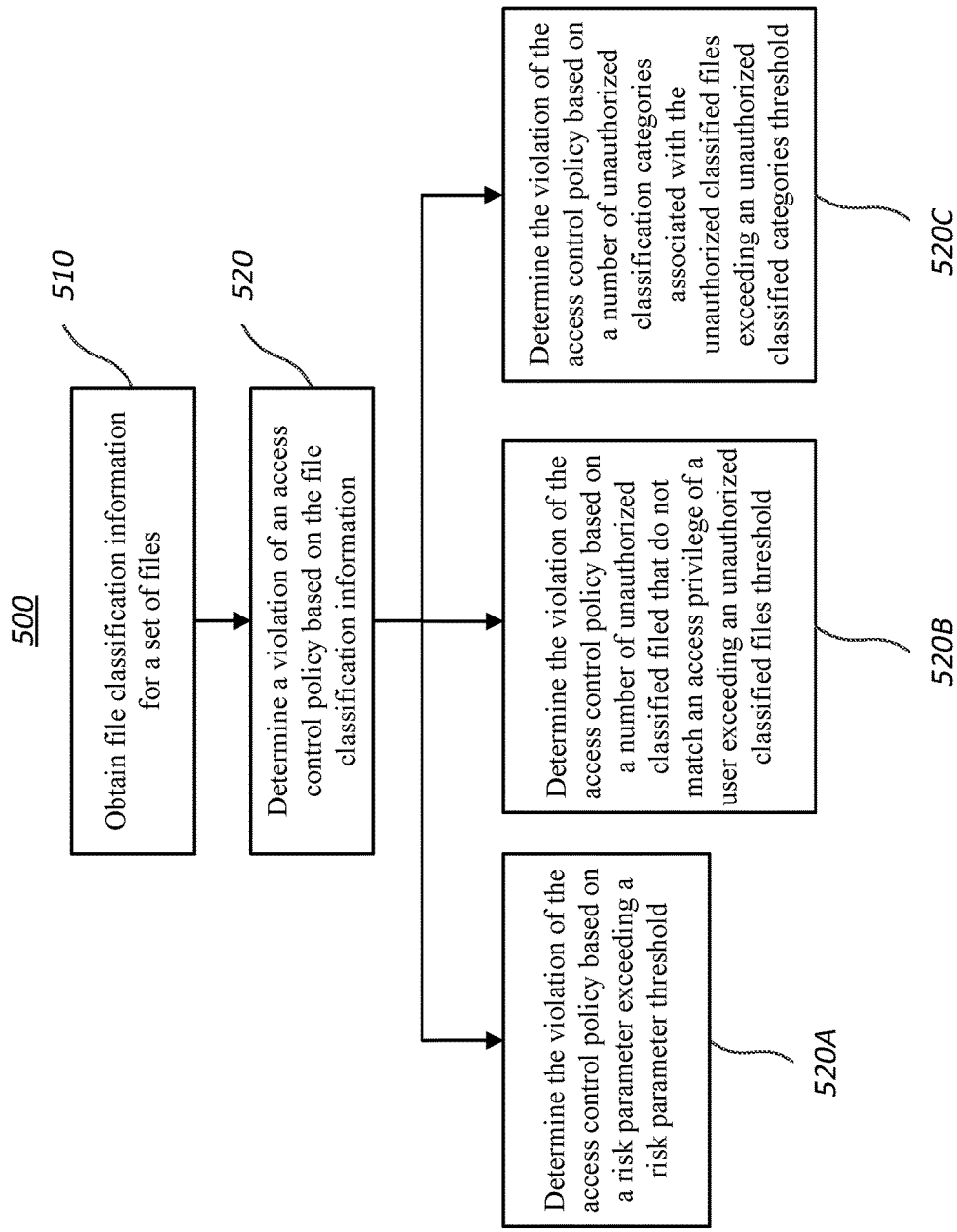
FIG. 5 illustrates a flow chart of an example method, in accordance with various embodiments of the disclosure.

FIG. 5 illustrates a flowchart of an example method 500, according to various embodiments of the present disclosure. The method 500 may be implemented in various environments including, for example, the environment 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 510, file classification information for a set of files may be obtained. the file classification information may define (1) a number of classified files within the set of files, (2) a number of classification categories associated with the classified files, (3) a number of unauthorized classified files that do not match an access privilege of a user, and (4) a number of unauthorized classification categories associated with the unauthorized classified files. At block 520, a violation of an access control policy may be determined based on the file classification information.

At block 520A, the violation of the access control policy may be determined based on a risk parameter exceeding a risk parameter threshold. The risk parameter may be determined based on (1) the number of classified files within the set of files, (2) the number of classification categories associated with the classified files, (3) the number of unauthorized classified files that do not match the access privilege of the user, and (4) the number of unauthorized classification categories associated with the unauthorized classified files.

At block 520B, the violation of the access control policy may be determined based on the number of unauthorized classified files that do not match the access privilege of the user exceeding an unauthorized classified files threshold.

At block 520C, the violation of the access control policy may be determined based on the number of unauthorized classification categories associated with the unauthorized classified files exceeding an unauthorized classification categories threshold.

Figure 6:
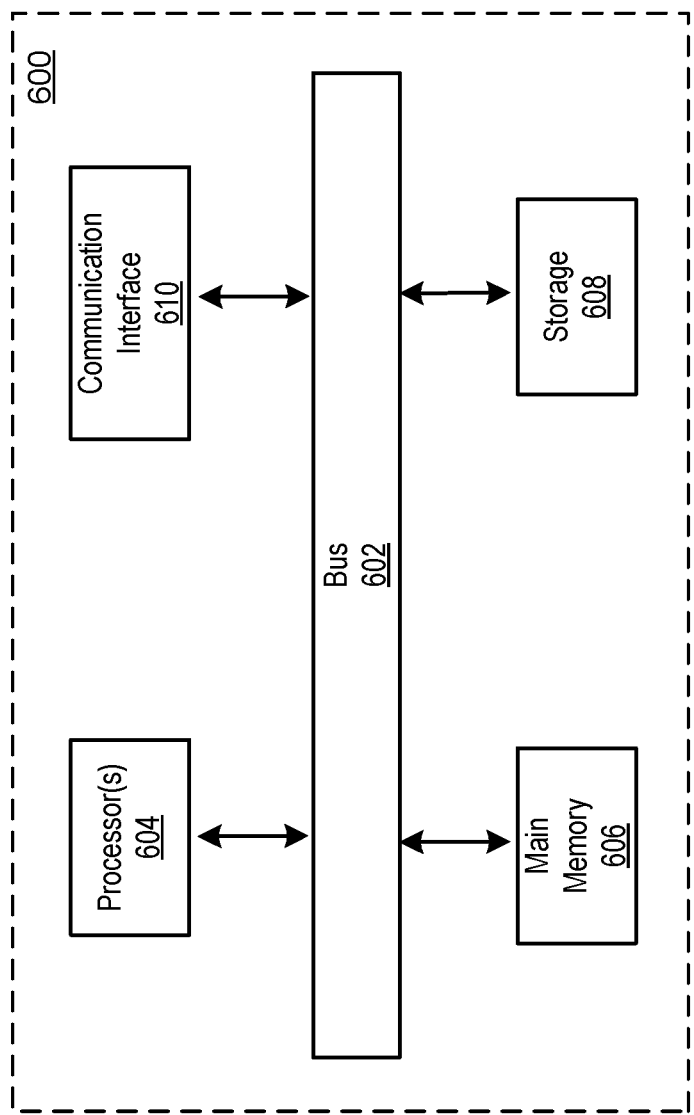
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information.

Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. For example, the process/method shown in FIG. 5 and described in connection with this figure may be implemented by computer program instructions stored in main memory 606. When these instructions are executed by processor(s) 604, they may perform the steps as shown in FIG. 5 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for protecting sensitive data, the system comprising:
   one or more processors; and
   a memory storing instructions that, when executed by the one or more processors, cause the system to perform:
      obtaining file classification information for a set of files, the file classification information defining (1) a number of classified files within the set of files, (2) a number of classification categories associated with the classified files, (3) a number of unauthorized classified files that do not match an access privilege of a user, and (4) a number of unauthorized classification categories associated with the unauthorized classified files; and
      determining a violation of an access control policy based on the file classification information.

2. The system of claim 1, wherein determining the violation of the access control policy based on the file classification information includes:
   determining a risk parameter based on (1) the number of classified files within the set of files, (2) the number of classification categories associated with the classified files, (3) the number of unauthorized classified files that do not match the access privilege of the user, and (4) the number of unauthorized classification categories associated with the unauthorized classified files; and
   determining the violation of the access control policy based on the risk parameter exceeding a risk parameter threshold.

3. The system of claim 1, wherein determining the violation of the access control policy based on the file classification information includes:
   determining the violation of the access control policy based on the number of unauthorized classified files that do not match the access privilege of the user exceeding an unauthorized classified files threshold.

4. The system of claim 1, wherein determining the violation of the access control policy based on the file classification information includes:
   determining the violation of the access control policy based on the number of unauthorized classification categories associated with the unauthorized classified files exceeding an unauthorized classification categories threshold.

5. The system of claim 1, wherein the set of files is stored in an electronic storage of a computing device, and at least a portion of the file classification information for the set of files is determined by a discovery agent running on the computing device.

6. The system of claim 5, wherein the discovery agent determines at least the portion of the file classification information based on (1) a determination of the classification categories associated with the classified files, and (2) the access privilege of the user.

7. The system of claim 1, wherein a prevention analysis of the classified files is performed based on the determination of the violation of the access control policy.

8. The system of claim 7, wherein a post-leak analysis of the classified files is performed based on the determination of the violation of the access control policy.

9. A method for protecting sensitive data, the method comprising:
  obtaining file classification information for a set of files, the file classification information defining (1) a number of classified files within the set of files, (2) a number of classification categories associated with the classified files, (3) a number of unauthorized classified files that do not match an access privilege of a user, and (4) a number of unauthorized classification categories associated with the unauthorized classified files; and
  determining a violation of an access control policy based on the file classification information.

10. The method of claim 9, wherein determining the violation of the access control policy based on the file classification information includes:
  determining a risk parameter based on (1) the number of classified files within the set of files, (2) the number of classification categories associated with the classified files, (3) the number of unauthorized classified files that do not match the access privilege of the user, and (4) the number of unauthorized classification categories associated with the unauthorized classified files; and
  determining the violation of the access control policy based on the risk parameter exceeding a risk parameter threshold.

11. The method of claim 9, wherein determining the violation of the access control policy based on the file classification information includes:
  determining the violation of the access control policy based on the number of unauthorized classified files that do not match the access privilege of the user exceeding an unauthorized classified files threshold.

12. The method of claim 9, wherein determining the violation of the access control policy based on the file classification information includes:
  determining the violation of the access control policy based on the number of unauthorized classification categories associated with the unauthorized classified files exceeding an unauthorized classification categories threshold.

13. The method of claim 9, wherein the set of files is stored in an electronic storage of a computing device, and at least a portion of the file classification information for the set of files is determined by a discovery agent running on the computing device.

14. The method of claim 13, wherein the discovery agent determines at least the portion of the file classification information based on (1) a determination of the classification categories associated with the classified files, and (2) the access privilege of the user.

15. The method of claim 9, wherein a prevention analysis of the classified files is performed based on the determination of the violation of the access control policy.

16. The method of claim 15, wherein a post-leak analysis of the classified files is performed based on the determination of the violation of the access control policy.

17. A non-transitory computer-readable medium for protecting sensitive data, the non-transitory computer-readable medium comprising instructions that, when executed, cause one or more processors to perform:
  obtaining file classification information for a set of files, the file classification information defining (1) a number of classified files within the set of files, (2) a number of classification categories associated with the classified files, (3) a number of unauthorized classified files that do not match an access privilege of a user, and (4) a number of unauthorized classification categories associated with the unauthorized classified files; and
  determining a violation of an access control policy based on the file classification information.

18. The non-transitory computer-readable medium of claim 17, wherein determining the violation of the access control policy based on the file classification information includes:
  determining a risk parameter based on (1) the number of classified files within the set of files, (2) the number of classification categories associated with the classified files, (3) the number of unauthorized classified files that do not match the access privilege of the user, and (4) the number of unauthorized classification categories associated with the unauthorized classified files; and
  determining the violation of the access control policy based on the risk parameter exceeding a risk parameter threshold.

19. The non-transitory computer-readable medium of claim 17, wherein determining the violation of the access control policy based on the file classification information includes:
  determining the violation of the access control policy based on the number of unauthorized classified files that do not match the access privilege of the user exceeding an unauthorized classified files threshold.

20. The non-transitory computer-readable medium of claim 17, wherein determining the violation of the access control policy based on the file classification information includes:
  determining the violation of the access control policy based on the number of unauthorized classification categories associated with the unauthorized classified files exceeding an unauthorized classification categories threshold.

* * * * *